(12) United States Patent
Nakazawa

(10) Patent No.: US 10,257,250 B2
(45) Date of Patent: Apr. 9, 2019

(54) MANAGEMENT SYSTEM, SERVER, CLIENT, AND METHOD THEREOF

(71) Applicant: CANON KABUSHIKI KAISHA, Tokyo (JP)

(72) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/957,245

(22) Filed: Aug. 1, 2013

(65) Prior Publication Data

US 2014/0040425 A1 Feb. 6, 2014

(30) Foreign Application Priority Data

Aug. 6, 2012 (JP) .................. 2012-173962

(51) Int. Cl.
*H04L 29/08* (2006.01)
*H04L 12/24* (2006.01)

(52) U.S. Cl.
CPC ............ *H04L 67/02* (2013.01); *H04L 41/048* (2013.01); *H04L 41/082* (2013.01); *H04L 41/0806* (2013.01); *H04L 41/20* (2013.01); *H04L 67/34* (2013.01); *H04L 41/28* (2013.01)

(58) Field of Classification Search
CPC ............................... G06F 15/16; H04L 67/02
USPC ....................................................... 709/217
See application file for complete search history.

(56) References Cited

U.S. PATENT DOCUMENTS

| | | | |
|---|---|---|---|
| 6,438,594 B1* | 8/2002 | Bowman-Amuah | G06F 9/4428 709/203 |
| 6,477,572 B1* | 11/2002 | Elderton | H04L 41/0893 709/224 |
| 6,477,667 B1* | 11/2002 | Levi | B60R 25/04 714/48 |
| 6,496,868 B2* | 12/2002 | Krueger | G06F 8/65 348/E5.105 |
| 6,760,745 B1* | 7/2004 | Tan | H04L 29/06 709/203 |

(Continued)

FOREIGN PATENT DOCUMENTS

| | | |
|---|---|---|
| CN | 101689121 A | 3/2010 |
| CN | 101714069 A | 5/2010 |

(Continued)

OTHER PUBLICATIONS

Hammad, U.S. Appl. No. 61/699,665 of US Pub 20140074637, provisional filed 2012.*

(Continued)

*Primary Examiner* — Ondrej C Vostal
(74) *Attorney, Agent, or Firm* — Canon U.S.A., Inc. IP Division

(57) ABSTRACT

A server stores association between client information and a network device as a management target of a client corresponding to the client information. In addition, the server creates an installer for starting a management function of the network device including client information and distributes the installer to the client. Then, when receiving a validation request including the client information corresponding to an execution of the installer from the client in the customer environment, the server performs validation processing of the client, and subsequently sends identification information of the network device as the management target of the client as a response.

8 Claims, 18 Drawing Sheets

(56) References Cited

U.S. PATENT DOCUMENTS

| | | | | |
|---|---|---|---|---|
| 6,871,193 B1* | 3/2005 | Campbell | G06Q 20/102 | 705/40 |
| 7,000,242 B1* | 2/2006 | Haber | G06F 17/30274 | 715/719 |
| 7,058,685 B1* | 6/2006 | van Zee et al. | 709/206 | |
| 7,146,402 B2* | 12/2006 | Kucherawy | H04L 51/12 | 709/206 |
| 7,441,021 B1* | 10/2008 | Perry | H04L 41/0806 | 345/33 |
| 7,475,428 B2* | 1/2009 | Smith | G06F 21/31 | 713/153 |
| 7,506,163 B2* | 3/2009 | Mansz | H04L 63/168 | 713/161 |
| 7,716,109 B1* | 5/2010 | Jacobs | G06Q 20/10 | 705/35 |
| 7,774,821 B2* | 8/2010 | Dunn | H04L 41/0806 | 709/217 |
| 7,809,802 B2* | 10/2010 | Lerman | G06F 17/30017 | 709/203 |
| 7,881,745 B1* | 2/2011 | Rao et al. | 455/551 | |
| 8,286,248 B1* | 10/2012 | Oliphant | G06F 21/556 | 726/22 |
| 8,321,526 B2* | 11/2012 | Raleigh | G06Q 10/06375 | 709/217 |
| 8,484,285 B2* | 7/2013 | Bretin | G05B 19/042 | 709/203 |
| 8,554,681 B1* | 10/2013 | Wieder | G06F 21/10 | 705/51 |
| 8,612,514 B2* | 12/2013 | Greschler | G06F 9/44526 | 709/203 |
| 8,650,277 B2* | 2/2014 | Gentile | H04L 43/065 | 709/217 |
| 8,700,729 B2* | 4/2014 | Dua | G06Q 20/20 | 705/64 |
| 2002/0010910 A1* | 1/2002 | Crudele | G06F 8/61 | 717/128 |
| 2002/0032763 A1* | 3/2002 | Cox et al. | H04L 67/1095 | 709/223 |
| 2002/0169963 A1* | 11/2002 | Seder | G06T 1/0064 | 713/176 |
| 2003/0014265 A1* | 1/2003 | Landry | G06Q 10/10 | 705/309 |
| 2003/0079030 A1* | 4/2003 | Cocotis | H04L 29/06 | 709/229 |
| 2003/0093674 A1* | 5/2003 | Harrison | H04L 9/30 | 713/168 |
| 2003/0195959 A1* | 10/2003 | Labadie | H04L 67/2804 | 709/224 |
| 2004/0236843 A1* | 11/2004 | Wing | H04L 29/06 | 709/219 |
| 2004/0268314 A1* | 12/2004 | Kollman | G06F 11/3476 | 717/128 |
| 2005/0125530 A1* | 6/2005 | Brockway | H04L 67/02 | 709/224 |
| 2005/0177750 A1* | 8/2005 | Gasparini | G06F 21/31 | 726/5 |
| 2005/0182938 A1* | 8/2005 | Seshadri | G06Q 10/107 | 713/176 |
| 2005/0228753 A1* | 10/2005 | Viger et al. | 705/51 | |
| 2006/0026589 A1* | 2/2006 | Schneider | G06F 8/60 | 717/174 |
| 2006/0059253 A1* | 3/2006 | Goodman | G06Q 10/10 | 709/223 |
| 2006/0085517 A1* | 4/2006 | Kaurila | G06F 9/44526 | 709/217 |
| 2006/0165060 A1 | 7/2006 | Dua | | |
| 2006/0258342 A1* | 11/2006 | Fok | G06F 9/4411 | 455/414.1 |
| 2006/0259767 A1* | 11/2006 | Mansz | G06F 21/51 | 713/168 |
| 2007/0022180 A1* | 1/2007 | Cocotis | H04L 29/06 | 709/217 |
| 2007/0035763 A1* | 2/2007 | Bard | G06F 3/1222 | 358/1.15 |
| 2007/0074034 A1* | 3/2007 | Adams et al. | 713/176 | |
| 2007/0088801 A1* | 4/2007 | Levkovitz | H04L 12/1859 | 709/217 |
| 2007/0226259 A1* | 9/2007 | Kacin | G06F 8/60 | |
| 2008/0037791 A1* | 2/2008 | Jakobsson | G06F 21/552 | 380/278 |
| 2008/0052384 A1* | 2/2008 | Marl | H04L 12/2807 | 709/223 |
| 2008/0109396 A1* | 5/2008 | Kacin | G06F 17/30867 | |
| 2008/0177994 A1* | 7/2008 | Mayer | G06F 9/4418 | 713/2 |
| 2008/0180724 A1* | 7/2008 | Selvaraj | G06F 3/1208 | 358/1.15 |
| 2008/0215722 A1* | 9/2008 | Hogaboom | H04L 29/06 | 709/224 |
| 2008/0276301 A1* | 11/2008 | Nataraj | G06F 8/60 | 726/3 |
| 2009/0007096 A1 | 1/2009 | Chavez | | |
| 2009/0059272 A1* | 3/2009 | Matsushita | G06F 9/4411 | 358/1.15 |
| 2009/0065571 A1* | 3/2009 | Jain | G06K 19/07739 | 235/379 |
| 2009/0132392 A1* | 5/2009 | Davis | G06Q 10/087 | 705/28 |
| 2009/0319649 A1* | 12/2009 | Larsen | H04L 41/0846 | 709/222 |
| 2010/0085599 A1 | 4/2010 | Nomura | | |
| 2010/0121156 A1* | 5/2010 | Yoo | G06F 19/3418 | 600/300 |
| 2010/0138534 A1* | 6/2010 | Mutnuru | H04L 43/0817 | 709/224 |
| 2010/0188975 A1* | 7/2010 | Raleigh | G06Q 10/06375 | 370/230.1 |
| 2010/0198742 A1* | 8/2010 | Chang | G06Q 10/00 | 705/319 |
| 2010/0238501 A1* | 9/2010 | Fujimaki | G06F 21/608 | 358/1.15 |
| 2010/0242037 A1* | 9/2010 | Xie | G06F 8/61 | 717/178 |
| 2010/0250676 A1* | 9/2010 | Ufford | G06Q 10/107 | 709/204 |
| 2010/0323678 A1* | 12/2010 | Corda | G06F 12/0638 | 455/418 |
| 2010/0325644 A1* | 12/2010 | van der Linden | G06F 9/4411 | 719/327 |
| 2010/0332615 A1* | 12/2010 | Short | H04L 63/08 | 709/217 |
| 2011/0047033 A1* | 2/2011 | Mahaffey | G06Q 30/0269 | 705/14.66 |
| 2011/0113473 A1* | 5/2011 | Corda | G06Q 20/32 | 726/3 |
| 2011/0119155 A1* | 5/2011 | Hammad | G06F 21/34 | 705/26.41 |
| 2011/0145164 A1* | 6/2011 | Lavoie | G06Q 30/0282 | 705/36 R |
| 2011/0194491 A1* | 8/2011 | Güemes Cabrejas | H04W 76/062 | 370/328 |
| 2012/0059916 A1 | 3/2012 | Ohashi | | |
| 2012/0084078 A1* | 4/2012 | Moganti et al. | 704/201 | |
| 2012/0143654 A1* | 6/2012 | Childers | G06Q 10/06393 | 705/7.39 |
| 2012/0240206 A1* | 9/2012 | Hoffman | G06Q 30/0201 | 726/6 |
| 2012/0266219 A1* | 10/2012 | Coleman et al. | 726/6 | |
| 2012/0320790 A1* | 12/2012 | Shaffer | H04W 40/246 | 370/254 |
| 2012/0324551 A1* | 12/2012 | Bretschneider | G06F 21/45 | 726/5 |
| 2013/0013499 A1* | 1/2013 | Kalgi | G06Q 20/12 | 705/41 |
| 2013/0036224 A1* | 2/2013 | Pousti | 709/225 | |
| 2013/0036459 A1* | 2/2013 | Liberman | H04L 9/0866 | 726/6 |

(56) References Cited

U.S. PATENT DOCUMENTS

| | | | |
|---|---|---|---|
| 2013/0067599 A1* | 3/2013 | Raje | G06F 8/65 726/29 |
| 2013/0191526 A1* | 7/2013 | Zhao | H04L 41/50 709/223 |
| 2013/0326614 A1* | 12/2013 | Truskovsky | G06F 21/44 726/19 |
| 2014/0047352 A1* | 2/2014 | Leppan | G06F 17/30884 715/749 |
| 2014/0058902 A1* | 2/2014 | Taylor | G06Q 30/0635 705/26.81 |
| 2014/0068722 A1* | 3/2014 | Hayat | 726/4 |
| 2014/0074637 A1* | 3/2014 | Hammad | G06Q 20/12 705/21 |
| 2014/0075515 A1* | 3/2014 | McColgan | 726/4 |
| 2014/0108263 A1* | 4/2014 | Ortiz | G06Q 30/3278 705/71 |
| 2014/0162598 A1* | 6/2014 | Villa-Real | 455/411 |
| 2014/0258112 A1* | 9/2014 | Hwang | G06Q 20/32 705/41 |
| 2015/0007262 A1* | 1/2015 | Aissi | G06F 21/60 726/2 |
| 2015/0161219 A1* | 6/2015 | Bendiabdallah | G06F 17/3089 707/722 |
| 2015/0347164 A1* | 12/2015 | Li | G06F 17/30899 715/760 |

FOREIGN PATENT DOCUMENTS

| | | |
|---|---|---|
| EP | 1424808 A1 | 6/2004 |
| JP | 11-331397 A | 11/1999 |

OTHER PUBLICATIONS

Ruiz-Martinez et al., "Payments frameworks for the purchase of electronic products and services", 2010.*
Roach, "Session Initiation Protocol (SIP)—Specific Event Notification", RFC3265, 2002.*
Hui et al., "The Value of Privacy Assurance: An Exploratory Field Experiment", 2007.*
Moses, "Trust Management in the public-key infrastructure", 1999.*
Roberts, "VeriSign Redesigns Trust Mark Seal", 2003.*
IBM, "Tivoli Software Distribution V4.0 and Tivoli Management Framework V3R7 Extend Your Enterprise Systems Management Capabilities", 2000 (Year: 2000).*
Tivoli, "Tivoli Software Distribution Components", 2000 (Year: 2000).*
Nagios Enterprises LLC: Nagios XI—Mass 1-9 Deploy SNCLIENT++, Jun. 13, 2012, Retrieved from the Internet: URL: http://assets.nagios.com/downloads/nagiosxi/docs/Mass_Deploy_NSClient_Plus_Plus, pp. 1-20.

* cited by examiner

FIG.4

CREATION OF CLIENT

TENANT NAME: ABC COMPANY LIMITED —401

CLIENT NAME: | TOKYO Office | —402

403

CANCEL | CREATE

FIG.5

| TENANT ID | CLIENT ID | CLIENT NAME | VALIDITY | VALIDATED DATE AND TIME | SIGNATURE KEY |
|---|---|---|---|---|---|
| 0001 | 0001C0001 | TOKYO Office | False | | |
| 0001 | 0001C0003 | OSAKA Office | True | 20120603 1254 | D3FE35.. |
| 0002 | 0002C0001 | HQ1 | True | 20120512 1803 | 9E34FC... |

FIG.6

| CREATION OF INSTALLER |
|---|

TENANT NAME: ABC COMPANY LIMITED ~601

CLIENT NAME: [ TOKYO Office ▼ ] ~602

[ CANCEL ]  [ CREATE ] ~603

FIG.7

```
<ClientInformation>
    <TenantID>0001</TenantID>
    <ClientID>0001C00001</ClientID>
    <ClientName>TOKYO Office</ClientName>
</ClientInformation>
```

FIG.8

| DOWNLOAD OF INSTALLER |
|---|
| YOU HAVE SUCCEEDED IN CREATION OF INSTALLER.<br>PLEASE DOWNLOAD INSTALLER.<br><br>TENANT NAME: ABC COMPANY LIMITED ~801<br>CLIENT NAME: TOKYO Office ~802<br>DOWNLOADED FILE: ClientInstaller_201206141843.zip ~803<br><br>　　　　　　　　　　　　　　　　　　　　[ CANCEL ] |

FIG.9

| INSTALL OF NETWORK DEVICE MANAGING CLIENT | |
|---|---|
| SETUP OF CLIENT<br>NECESSARY COMPONENTS WILL BE INSTALLED TO CREATE<br>USAGE ENVIRONMENT FOR CLIENT. | |
| NAME | STATUS |
| ABC Database System | ALREADY INSTALLED |
| XYZ Library | WAITING FOR INSTALL |
| NETWORK DEVICE MANAGING CLIENT | WAITING FOR INSTALL |

901

902 — START INSTALLING | CLOSE

FIG.10

| | | | | |
|---|---|---|---|---|
| ☐ | SERIAL # | PRODUCT NAME | INSTALLED LOCATION | IP ADDRESS |
| ☐ | CF918700 | LPB 1200C | A1F north | 192.168.12.101 |
| ☑ | BD912820 | LBP 2400 | A1F south | 192.168.12.113 |
| ☐ | XA919384 | MFP C5800 | B3F east | 192.168.12.236 |
| ☑ | YY091821 | MFP C6700 | B2F west | 192.168.12.8 |
| ☑ | XM99385 | MFP 4300 | A5F north | 192.168.12.189 |
| ☐ | CW00918 | LBP 5600 | D2F | 192.168.12.172 |
| ☑ | ZU00028 | MFP C2300 | B2F east | 192.168.12.89 |

DESIGNATION OF ASSOCIATED DEVICE

TENANT NAME: ABC COMPANY LIMITED
CLIENT NAME: TOKYO Office —1001

1002

1003— SAVE   CANCEL

FIG.11

| VALIDATION OF CLIENT | | |
|---|---|---|
| PROXY: | ☑ USE | |
| PROXY SERVER: | proxy.abc.com | ~1101 |
| PORT NO.: | 8080 | |
| AUTHENTICATION: | ☑ USE AUTHENTICATION | |
| USER: | yamada.taro | |
| PASSWORD: | ******** | |
| | | VALIDATE 1102 |

FIG.13

GET/mds/V10/services HTTP/1.1
Content-Type: application/xml;charset=utf-8
X-Cmds-Date: Fri, 15 Jun 2012 08:10:57 GMT
Content-Location:/mds/V10/services
Authorization: HmacSha256 ¥
0001#0001C0001: Niamx7qMftX8t0vHnMim5eAjrLPa0i4inO5hvkB8En4=
Connection: Keep-Alive

FIG.15A

| DESIGNATION OF ASSOCIATED DEVICE | | | |
|---|---|---|---|
| TENANT NAME: ABC COMPANY LIMITED<br>CLIENT NAME: TOKYO Office ~1501<br>FUNCTION NAME: STATUS MONITORING SERVICE    1502 | | | |
| ☐ SERIAL # | PRODUCT NAME | INSTALLED LOCATION | IP ADDRESS |
| ☐ CF918700 | LPB 1200C | A1F north | 192.168.12.101 |
| ☑ BD912820 | LBP 2400 | A1F south | 192.168.12.113 |
| ☐ XA919384 | MFP C5800 | B3F east | 192.168.12.236 |
| ☑ YY091821 | MFP C6700 | B2F west | 192.168.12.8 |
| ☑ XM993852 | MFP 4300 | A5F north | 192.168.12.189 |
| ☐ CW009181 | LBP 5600 | D2F | 192.168.12.172 |
| ☑ ZU000285 | MFP C2300 | B2F east | 192.168.12.89 |

1503 — SAVE    CANCEL

FIG.15B

| CLIENT ID | FUNCTION ID | NETWORK DEVICE ID |
|---|---|---|
| 0001C0001 | E001 | BD912820 |
| 0001C0001 | E001 | YY091821 |
| 0001C0001 | E001 | XM993852 |
| 0001C0001 | E001 | ZU000285 |
| 0001C0001 | E003 | CF918700 |
| 0001C0001 | E003 | YY091821 |
| 0001C0001 | E003 | XA919384 |
| 0001C0001 | E003 | XM993852 |
| 0001C0001 | E003 | CW009181 |

MANAGEMENT SYSTEM, SERVER, CLIENT, AND METHOD THEREOF

BACKGROUND OF THE INVENTION

Field of the Invention

The present invention relates to a technique for establishing a system capable of managing devices on a network.

Description of the Related Art

In a network device management system that manages devices connected to a network, a server on which dedicated management software operates realizes a management function by communicating with the devices as management targets. When a large number of devices connected to regionally distributed networks are centrally managed, there are some management systems in which a client is installed for each distributed network for the purpose of distribution of processing or reduction of loads. The server causes each client to obtain various pieces of information from the devices as management targets, and to transmit the information to the server.

In order to establish the management system, identification information needs to be mutually registered between the server and the client. Japanese Patent Application Laid-Open No. 11-331397 includes a discussion about initialization processing for setting information about a management apparatus as a monitoring target to a centralized management apparatus. In this patent document, when identification information (i.e., an ID number) of the management apparatus is input from an operation unit of a copying machine, the management apparatus obtains the information from the copying machine, and transmits the identification information to the centralized management apparatus. Finally, the management apparatus receives initial data including information such as transmitted time of a regular report from the centralized management apparatus, and stores the initial data in itself, thus the initialization processing is completed.

In the above-described prior art, when identification information is input via the operation unit, there is a possibility that an input mistake by a worker may occur. Further, in a case where many devices are installed at the same time, manual inputting job itself becomes a significant load.

SUMMARY OF THE INVENTION

The present invention is directed to a method for establishing appropriately and easily a management system for managing network devices.

According to an aspect of the present invention, a management system including a server for managing network devices installed in a customer environment, the server includes a first creation unit configured to create client information, a second creation unit configured to create an installer for starting a management function of the network devices, including the created client information, a storage unit configured to store on a storage device association between the created client information, and network device as the management target of a client corresponding to the client information, a reception unit configured to receive a validation request including the client information, corresponding to an execution of the created installer from the client in the customer environment, and a response unit configured, in a case where the client information included in the validation request is stored on the storage device, to perform validation processing of the client, and subsequently to respond identification information of the network device as the management target of the client stored on the storage device, and the client includes an execution unit configured to obtain and execute the installer from the server, a request unit configured to transmit a validation request including the client information included in the installer to the server, according to an execution of the installer, and a transmission unit configured to transmit the information obtained from the network devices to the server, based on the identification information of the network device as the management target included in the response from the server.

Further features of the present invention will become apparent from the following description of exemplary embodiments with reference to the attached drawings.

BRIEF DESCRIPTION OF THE DRAWINGS

FIG. 4 illustrates an example of a client creation screen.

FIG. 5 illustrates an example of a management table of client information.

FIG. 6 illustrates an example of an installer creation screen.

FIG. 7 illustrates an example of contents of a setting file included in a client installer.

FIG. 8 illustrates an example of a download screen of an installer.

FIG. 9 illustrates an example of an install screen of a client installer.

FIG. 10 illustrates an example of a screen for performing association between a client and a device.

FIG. 11 illustrates an example of initial setting screen of a client.

FIG. 13 illustrates an example of a header portion of a request transmitted by a client to a server.

FIGS. 15A and 15B illustrate examples of associations among client information, services, and information of network devices according to the second exemplary embodiment.

DESCRIPTION OF THE EMBODIMENTS

Various exemplary embodiments, features, and aspects of the invention will be described in detail below with reference to the drawings.

Figure 1:
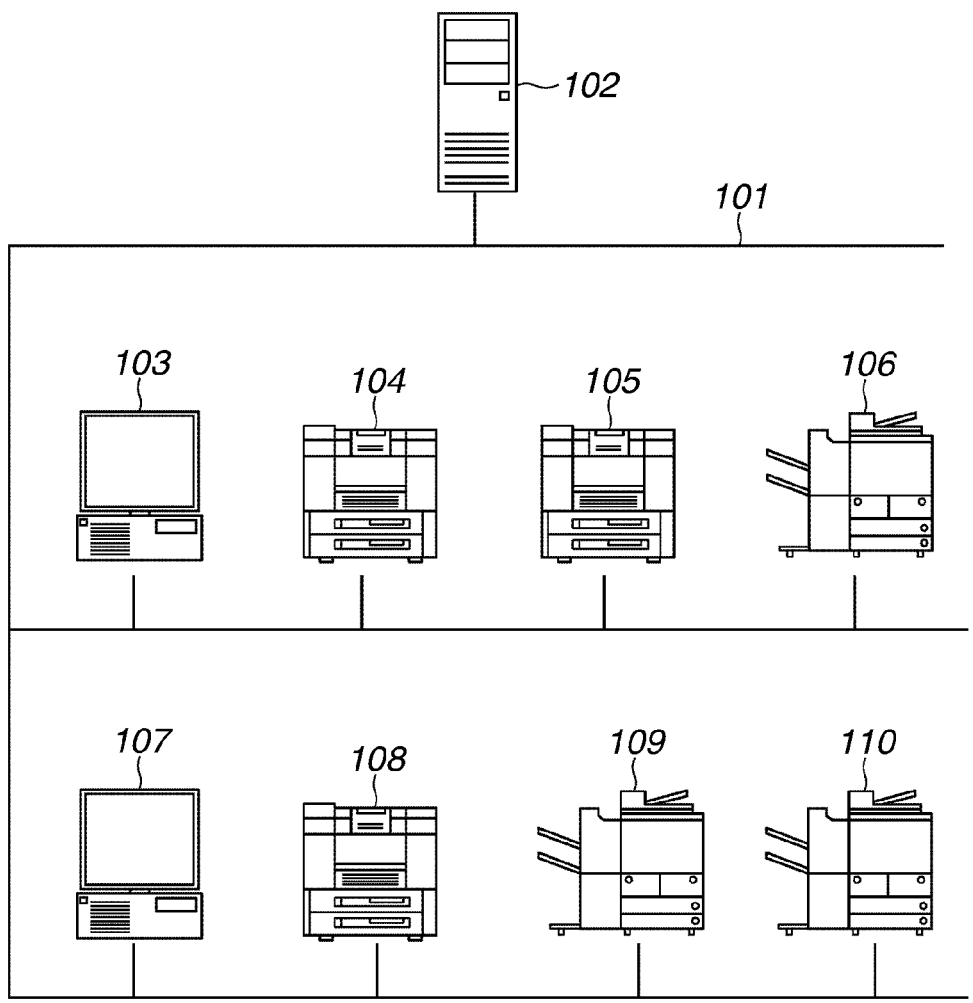
FIG. 1 illustrates an example of a configuration of a network device management system.

FIG. 1 is a configuration diagram of a network device management system according to a first exemplary embodiment of the present invention. In FIG. 1, a server, respective clients, devices as management targets are connected to a local area network (LAN) 101.

Server software of the network device management system operates on a host computer 102. Client software of the network device management system operates on host computers 103 and 107. Network devices 104, 105, 106, 108, 109, and 110 are management targets of the network device management system. Examples of the network device include image forming apparatuses such as printers or copying machines. Besides, the present invention is applicable to computer peripheral devices (such as a scanner and a network camera) connectable to the network, instead of these image forming apparatuses. In FIG. 1, the client software operating on the host 103 handles the devices 104, 105, and 106 as the management target thereof. The client software operating on the host 107 handles the devices 108, 109, and 110 as the management target thereof.

Figure 2:
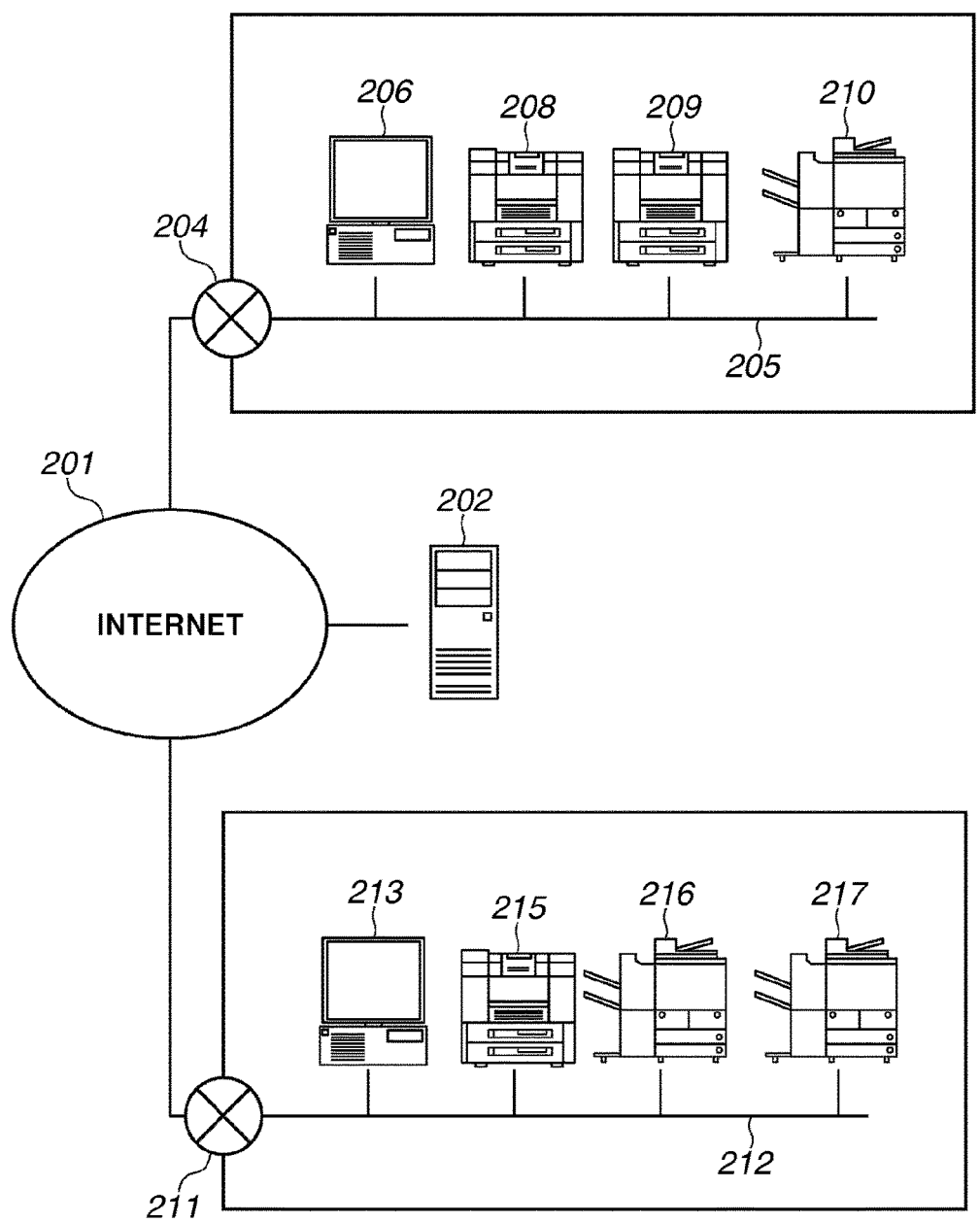
FIG. 2 illustrates an example of a configuration of a network device management system including an Internet.

FIG. 2 is a configuration diagram in a case where the network device management system provides services via an Internet. The network device management system connects to networks of a plurality of customers via an Internet 201, and performs management of the network devices connected to the respective customer networks.

Server software of the network device management system operates on a host computer 202 (hereinbelow, referred to as a server), and the server 202 is connected to the Internet 201. Local area networks 205 and 212 of the respective customers are connected to the Internet 201 via firewalls 204 and 211. Each client software of the network device management system operates on respective host computers 206 and 213 (hereinbelow, referred to as a client). Network devices 208, 209, and 210 are managed by the client 206, and devices 215, 216, and 217 are managed by the network client 213. The server 202 identifies the clients 206 and 213 and stores information of the devices to be managed by the respective clients using a predetermined database, thereby managing both clients.

The server software of the network device management system provides services such as reporting of an aggregation result by collecting log information pieces of the management target network devices via the client 206 or the like. The reporting service is provided by a system administrator of a customer, so that operating statuses of the network devices or whether the devices are economically used in the customer can be assessed. The collected log information pieces include a history of jobs processed by the network devices, a power log in which power consumptions of the network devices are recorded, and so on.

Figure 17:
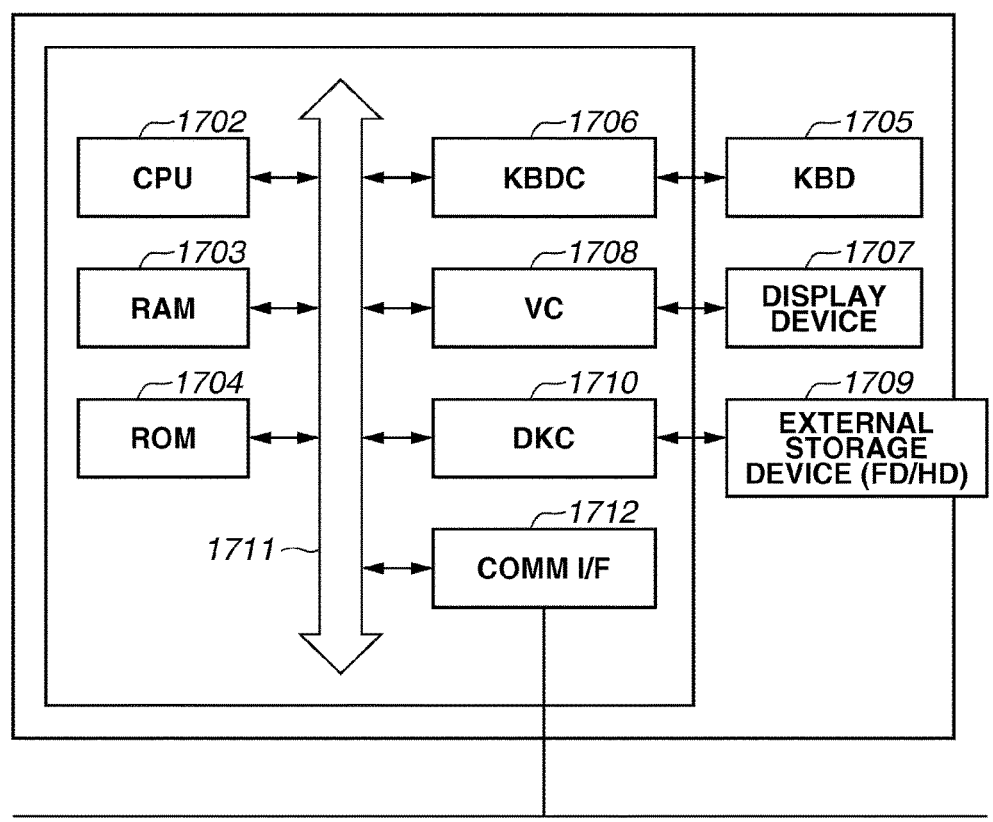
FIG. 17 is a block diagram illustrating a hardware configuration of a host computer.

FIG. 17 is a block diagram illustrating a hardware configuration common to the information processing apparatuses such as the host computers 102, 103, 107, 202, 206, and 213. The host computer is provided with at least a storage device such as a central processing unit (CPU) 1702, or a read only memory (ROM) 1704.

The CPU 1702 executes software stored in the ROM 1704 or in an external storage device 1709, or downloaded from the network such as the LAN, and comprehensively controls respective devices connected to a system bus 1711. A random access memory (RAM) 1703 functions as a main memory or a work area of the CPU 1702. The external storage device 1709 includes a hard disk (HD), a flash memory, and the like. The external storage device 1709 stores various types of applications, database data, and user files, including a boot program, an operating system, a database server, a web server, and a web browser. Further, in the host computer, a keyboard controller (KBDC) 1706 transmits input information from a keyboard (KBD) 1705 or a pointing device (not illustrated) to the CPU 1702. A video controller (VC) 1708 controls display of a display device 1707 including a cathode ray tube (CRT), a liquid crystal display (LCD), and the like. A disk controller (DKC) 1710 controls access with the external storage device 1709. The host computer is connected to the network via a communication controller (COMM I/F) 1712. In order to realize exemplary embodiments of the present invention described below, the CPU 1702 executes the server software, the client software, or the installer which are provided as control programs.

Hereinbelow, the exemplary embodiments will be described according to the configuration of the network device management system illustrated in FIG. 2.

Figure 3:
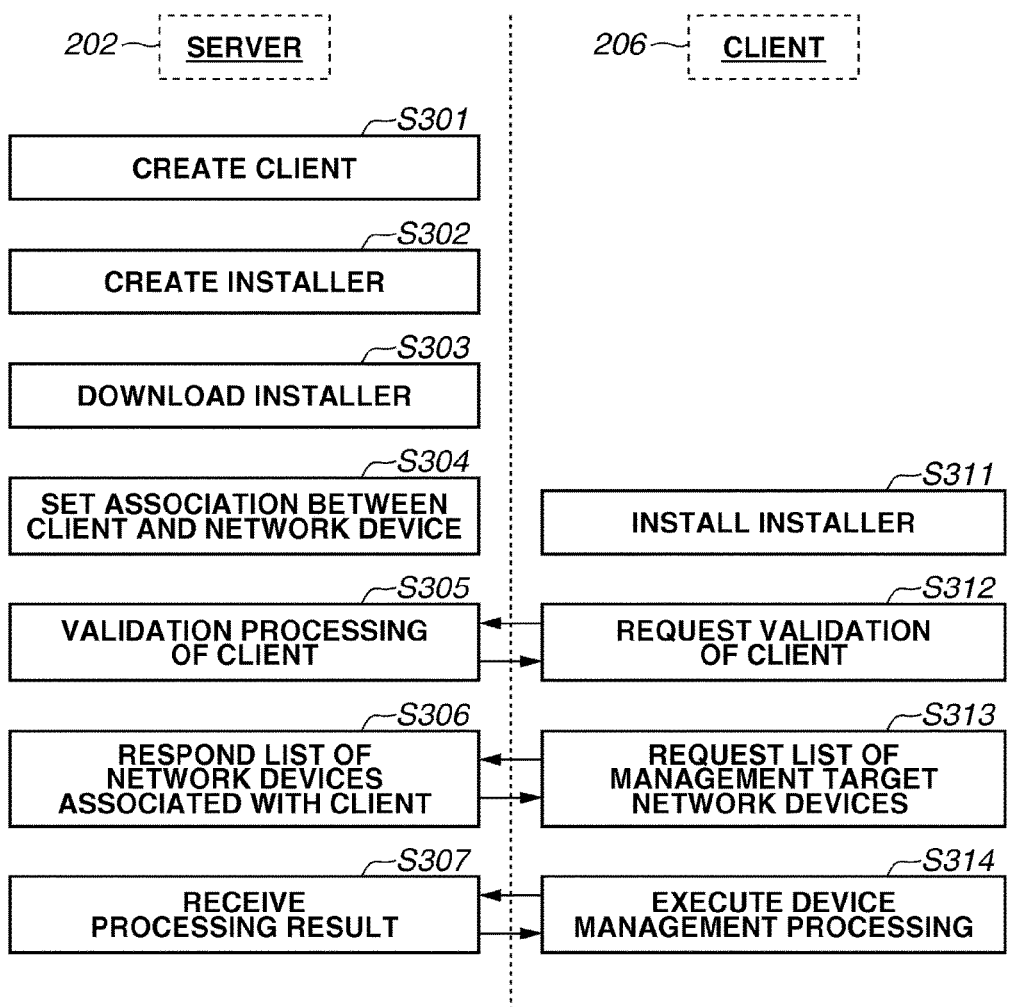
FIG. 3 is a flow chart illustrating processing for establishing a network device management system.

FIG. 3 is a flow chart illustrating the processing from creation of a client to a start of device management at the client in the network device management system according to the present exemplary embodiment. The left side in FIG. 3 illustrates the processing of the server 202, and the right side illustrates the processing of the client 206 (or 213).

In step S301, the server 202 generates client information for the client 206 on which the client software operates according to an operation of a user (i.e., a system administrator), and stores the client information on a storage device or the like in the server 202. The client information is information assigned to the server 202 to determine a client to be a management target. In step S302, the server 202 generates a client installer for installing the client software. The client installer generated in step S302 includes the client information for the client 206 generated in step S301. Next, in step S303, the server 202 transmits the client installer created in step S302 to a transmission source in accordance with a download request via the network such as the Internet.

In step S304, the server 202 associates the client information created in step S301 with the information of the network devices which the client should manage in response to an instruction from the user, and stores the association in a storage device or the like in the server 202. The processing in step S304 can be executed any number of times at an arbitrary time point after the generation of the client information (in step S301), and the number of the management target network devices of the respective clients can be increased or decreased in response to the instruction from the user.

In step S311, the host computer in the customer executes the downloaded client installer, and the host computer becomes the client 206 on which the client software operates.

In step S312, the client 206 requests the server 202 to validate the client 206 using the client information included in the client installer, as one of initial installation processing after install of the software. The client information is included in request data related to the validation request. In step S312, the server 202 which has received the request data as the validation request from the client 206 determines whether the client information included in the request data exists in the storage device in the server 202. If the client information exists, the server 202 records the client 206 as valid in the storage device. At this time point, the server 202 can recognize that a client under the management of which network devices are subjected to the management has increased. Then, the server 202 sends a notification of successful validation as a response to the request from the client 206. Since then, the server 202 appropriately returns responses to various requests from the client 206. On the other hand, concerning a request from an unknown client that is not under the management, the server 202 will basically discard the request.

In step S313, the client 206 requests a list of network devices to be managed by the client 206 from the server 202. In step S306, the server 202 receives the request for the network device list from the client 206 in step S313. The server 202 refers to the information about the list of the network devices associated with the client 206 in step S304, and responds to the client 206.

In step S314, the client 206 executes device management processing on the management target network device obtained from the server 202. The client 206 transmits an execution result of the management processing to the server 202 as needed. In step S307, the server 202 receives the processing result of the management processing, and performs storage processing or notification processing of the information. Examples of the management processing include collection of various types of log information accumulated in the network devices, and notification of the collection result to the server 202. In addition, the management processing includes collection of setting information such as setting values of software set for the network devices and address books.

Then, the client 206 repeats the processing in steps S313 and S314 on a regular basis (e.g., twice per day), or in accordance with an instruction of the user.

Hereinbelow, each step in FIG. 3 will be described in detail.

FIG. 4 illustrates an example of a client creation screen provided on the server 202 in step S301. In FIG. 4, customer tenant information (tenant information) is input in a user interface (UI) control 401. A user inputs a name for identifying the client 206 into a UI control 402. When the user presses a "create" button 403, the server 202 stores the created client information in the storage device in the server 202.

FIG. 5 illustrates an example of information pieces of clients which the server 202 stores in step S302. The client information is stored, for example, in the storage device in the server 202, or in a database in a database management system. The database management system can operate on a host computer different from the server 202.

A meaning of each column in the table illustrated in FIG. 5 is as follows. A "Tenant ID" column is an identifier that uniquely identifies each customer tenant, and is information corresponding to the tenant information. A "Client ID" column is an identifier that uniquely identifies each client, and a "Client Name" column is information indicating the client name 402 in FIG. 4 input by the user.

A "Validity" column indicates a logical value representing whether the client has been validated by the processing in steps S312 and S305 in FIG. 3, and when it is validated, "True" is given. A "Validated Date and Time" column indicates validated date and time.

A "Signature Key" column is information for giving a signature on the data transmitted from the client 206 to the server 202 (i.e., information such as an encryption key), and is prepared to secure security. The server 202 confirms the signature of data transmitted from the client, and thus confirms that the received data is really the one from the client 206.

As illustrated in FIG. 5, it is found that validation is not performed and the validated date and time and the signature key are not set immediately after the client has been created (in step S301). Further, in FIG. 5, the client information pieces of different tenants are stored in one table, however, it can be configured to have a client table for each tenant in order to secure confidentiality.

FIG. 6 illustrates an example of an installer creation screen provided on the server 202 in step S302. In FIG. 6, tenant information is input in a UI control 601. A dropdown list 602 is used to select a client that creates an installer. In the dropdown list, client names of clients are enumerated which are not validated in the table in FIG. 5 and associated with the tenants indicated in the UI control 601. When a user (system administrator) presses a "Create" button 603, the server 202 creates a client installer including the client information of the client selected in the dropdown list 602.

The client installer created in this process includes an installer for installing the client software and a setting file including at least apart of the client information in FIG. 5. Further, the client installer can include an installer of separate software necessary for operating the client software. FIG. 7 illustrates an example of contents of a setting file included in the client installer. For example, the setting file is described in an extensible markup language (XML) format. In the above-described installer creation processing in step S302, the setting file is encrypted, and the encrypted setting file is included in the client installer.

FIG. 8 illustrates an example of a download screen of the installer which the server 202 provides to the client in step S303. In FIG. 8, tenant information 801 and a client name 802 selected from the dropdown list 602 are indicated. A link 803 is used to download the created client installer. In response to clicking on the download link 803 by the user, the server starts download processing of the created client installer.

FIG. 9 illustrates an example of an install screen of the client installer displayed in the host computer in step S311.

In FIG. 9, a list 901 indicates components (software) necessary for operating the host computer as the client 206 and their installation statuses. The example indicates that "ABC Database System" has been already installed, but "XYZ Library" and "Network Device Managing Client" have not been installed yet. When the user presses a "Start Installing" button 902, the client installer installs necessary components in the host computer. In the example in FIG. 9, two components in the "Waiting For Install" status will be installed.

FIG. 10 illustrates an example of a setting screen, provided on the server 202, for associating the client with the device in step S304. In FIG. 10, a client name 1001 indicates information about the client for which association is set. A list 1002 lists network devices which can be associated with the client, and a network device to be a management target of the client is selected by the user. When the user presses a "Save" button 1003, the server 202 associates the client with one or more selected network devices and stores the association in the storage device or the like in the server 202.

FIG. 11 illustrates an example of an initial setting screen for performing request processing for validation of the client 206 in step S312. In this example, a setting relating to the firewall 204 for connecting from the client 206 to the server 202 is performed.

A UI control 1101 is used to input a proxy setting for connecting to the server 202 on the Internet via the firewall 204. When the user presses a "Validate" button 1102, the client 206 reads an input content of the proxy setting of the UI control 1101, and transmits a validation request of the client 206 to the server 202 using the input proxy setting. The client information is included in the request. Upon receiving a response indicating successful validation to the request from the server 202, the client 206 stores the proxy setting input via the UI control 1101 and the information indicating that the client 206 itself has been validated in the storage device in the client 206.

Figure 12:
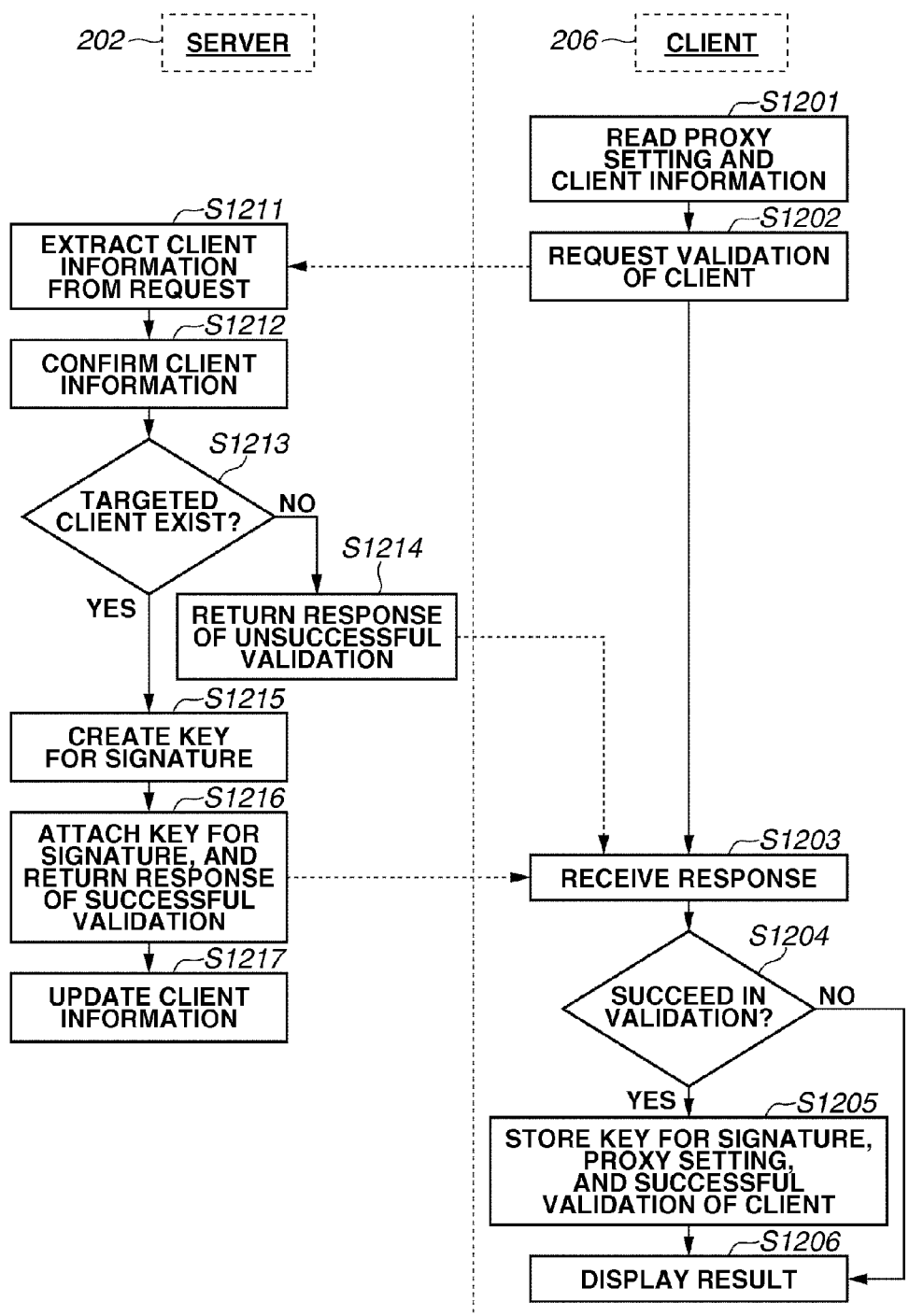
FIG. 12 is a flow chart illustrating details of validation processing of a client.

FIG. 12 is a flow chart illustrating in detail the above-described processing in steps S312 and S305 in FIG. 3. In FIG. 12, the left side illustrates the processing of the server 202, and the right side illustrates the processing of the client 206. In response to the "Validate" button 1102 in FIG. 11 being pressed by the user, the processing is started.

In step S1201, the client 206 obtains the proxy setting input via the UI control 1101 in FIG. 11 and the client information included in the client installer.

Next, in step S1202, the client 206 connects to the server 202, using the extracted proxy setting, and transmits a request for validating the client 206 to the server 202. The request for validating the client 206 includes the identification information (e.g., the client ID and the client name) of the client 206 and the identification information such as the customer tenant ID (the tenant ID) and the customer name (the tenant name) for identifying the customer.

In step S1211, the server 202 which has received the request for validation from the client 206 extracts the identification information of the tenant and the client from the received request. Next, in step S1212, the server 202 searches and checks whether a record corresponding to the extracted identification information exists in the management table of the client information illustrated in FIG. 5. In step S1213, the server 202 performs determination based on a result of the search. If a record of the client information corresponding to the identification information included in the received request does not exist (NO in step S1213), or, if a "Validity" column of the record of found corresponding client information is "True", then in step S1214, the server 202 returns a response including a fact of failure in validation to the client 206. In this case, the server 202 determines that the request is from an unregistered client or an unfair validation resulting in misappropriation of the client information and suspends the validation processing.

On the other hand, in step S1213, if a record of the client information corresponding to the identification information included in the request from the client 206 exists (YES in step S1213), and the "Validity" column of the record is "False", the server 202 performs the processing in step S1215 and subsequent steps for validation of the client 206. In step S1215, the server 202 generates a key for signature used in the client 206. Next, in step S1216, the server 202 returns a response including the key for signature generated in step S1215 and the information indicating that the server 202 succeeded in the validation of the client 206 to the client 206.

In step S1217, the server 202, after confirming a reply of the response, updates the "Validity" column of the record relating to the client 206 in the management table illustrated in FIG. 5 with "True" and the "Signature Key" column with the information of the signature key generated in step S1215. Further, the server 202 updates the "Validated Date and Time" column with current date and time.

In step S1203, the client 206 receives a response from the server 202 as a response to the validation request. The response received in step S1203 is the response that the server 202 transmits in step S1214 or in step S1216 described above. In step S1204, if the received response indicates the success of validation (YES in step S1204), the processing proceeds to step S1205. Whereas if the received response indicates the failure in validation (NO in step S1204), the processing proceeds to step S1206.

In step S1205, the client 206 stores, in the storage device in the client 206, the signature key to be used for signature at the time of communication with the server 202 which is included in the response and the proxy setting input via the above-described setting screen in FIG. 11.

In step S1206, the client 206 displays the success or failure of the validation processing of the client described above in accordance with the response from the server 202.

FIG. 13 illustrates an example of a header portion of the request which the client 206 transmits to the server 202. A mark "⌐" at the end of the fifth row indicates that the fifth and sixth rows actually form one row.

It is assumed that the request from the client 206 to the server 202 is performed in accordance with a hypertext transfer protocol secure (HTTPS) protocol. In FIG. 13, Authorization row includes a calculation method of signature (HmacSha256) and a tenant ID (0001), and a client ID (0001C0001) and an HMAC-SHA256 signature. The signature is the one obtained by calculating HMAC-SHA256 signature of a character string which combines particular elements in the header and encoding the HMAC-SHA256 signature with BASE64.

The server 202 which receives the request extracts identification information of the tenant and the client from the Authorization row of the header, searches the management table of the client information in FIG. 5 for a corresponding record, and obtains a signature key. As a result of the search, in a case where target client information does not exist in the management table, the server 202 determines the request as invalid, and suspends the processing.

The server 202, next, creates a character string from the elements in the header which become a signature target, calculates HMAC-SHA256 signature using the signature key, and compares the HMAC-SHA256 signature with the signature in the header. As a result of comparison, if both signatures coincide with each other, the server 202 continues the processing regarding that the request is transmitted from the client 206. As a result of comparison, if both signatures do not coincide with each other, the server 202 determines that the request is not from the client 206, and suspends the processing.

According to a second exemplary embodiment, it is assumed that the network device management system provides a plurality of services, in addition to the above-described reporting service. Characteristic processing in such the system will be described in detail in the present exemplary embodiment.

For example, a plurality of services includes a service of collecting setting values of network devices, storing them in a database or the like, and using them for backup or synchronization of the settings of the network devices. Other than that, there is a status monitoring service for monitoring statuses of the network devices (e.g., a presence or absence of errors or warnings), storing the status information in the database or the like, and generating operating status reports of the network devices. Further, there is a failure prediction service for performing failure prediction by analyzing the information managed in the database and arranging a serviceperson who performs device maintenance for preliminary repair from the server 202 as needed.

The network device management system enables tenants to selectively use these services. In other words, the server 202 manages association between services to be processed for each client under the management and network devices which are targets of these services. Further, service contents which tenants can select can be added later to the network management system.

Hereinbelow, the same reference numerals are used for the same configurations and the same steps as those in the first exemplary embodiment, and therefore detailed description thereof will be avoided.

Figure 14:
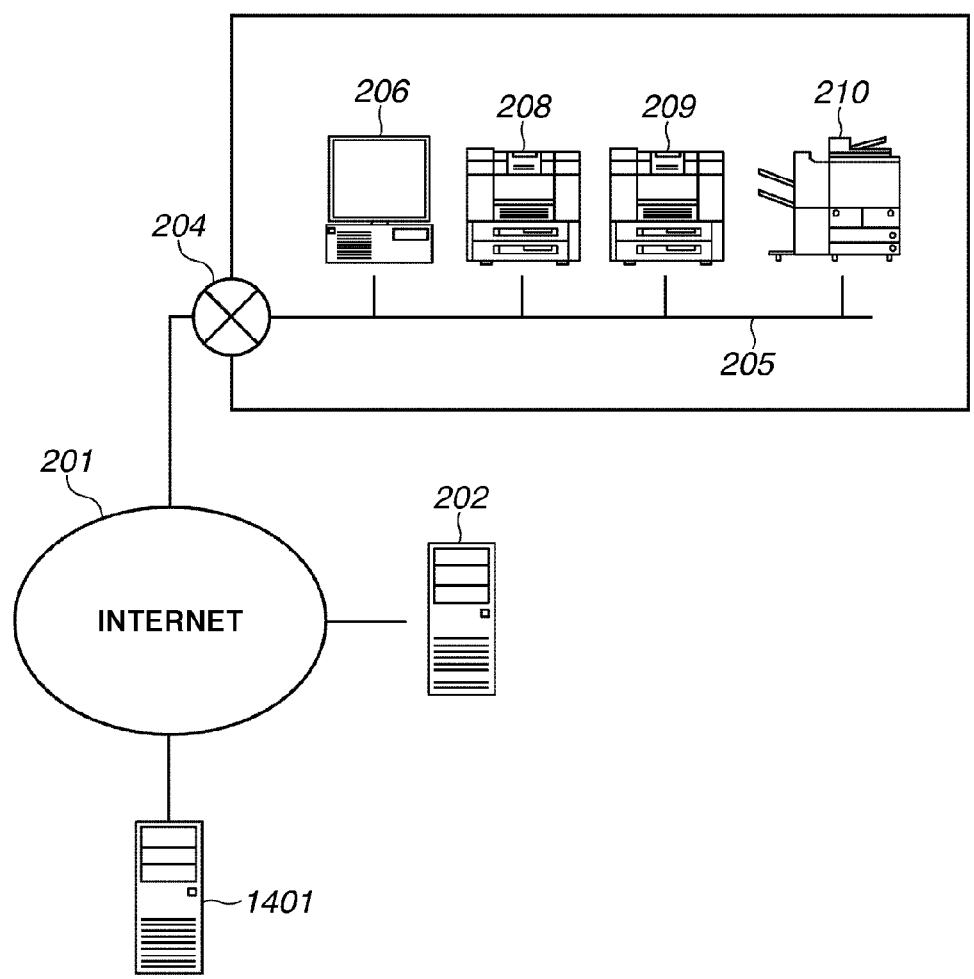
FIG. 14 is a configuration diagram illustrating a management system including a network device management system according to a second exemplary embodiment and another system on an Internet.

FIG. 14 illustrates an example of a system configuration for realizing the processing in a case where a service is added to the network device management system. The example indicates a configuration in a case where the added service is realized by cooperating with a function provided by another system different from the server 202 of the network device management system.

A maintenance service system 1401 includes a dedicated server connected to the Internet 201 and collects and accumulates information pieces for maintenance of the network devices. The other system 1401 may have different users or usage purposes from those of the network device management system.

Services which the other system 1401 independently provides include a service for determining degree of consumption from collection of information pieces about a number of uses, operating hours, or replacement date and time of each part in the network devices, and dispatching a serviceperson as needed. In addition, the other system 1401 may provide a help desk service for answering an inquiry from a user. Further, the other system 1401 may perform inventory management of consumables such as toner cartridges or toner bottles of the tenants, and performs a service for automatic delivery to customer environments in order to reduce downtime. In order to realize these services, the other system 1401 receives information pieces, such as counter information indicating the number of printouts or the number of use of parts, trouble information, and notification of remaining amounts of consumables (i.e., toner low or toner empty) from the network devices, and manages these information pieces in the database.

The server 202 can provide a new service such as generating analysis reports such as the above-described failure prediction or optimal usage method of the network devices by using the information pieces accumulated in the other system 1401. In this case, communications using web service will be performed and information will be exchanged as appropriate between the server 202 and the other system 1401.

Sharing the information between the server 202 and the other system 1401 has an advantage that a new service can be provided to the tenants of the network device management system. Therefore, in a case where the information of the network devices is collected from the customer environment at the time of providing such new service, it is desirable to establish a mechanism in which the client 206 transmits necessary information to each of the server 202 and the other system 1401.

FIG. 15A illustrates an example of a setting screen for associating tenant information, client information, and services (function names) provided on the server 202, with target network devices. The screen in FIG. 15A is a modification of that in FIG. 10 according to the first exemplary embodiment.

In FIG. 15A, information 1501 indicates client information and information about a service (function name) on which association is performed. In this example, the network devices which are targets of the status monitoring service can be designated on the client having the tenant name of ABC Company Limited and the client name of TOKYO Office. A list 1502 lists the network devices which can be associated with the client and the target service, and the target network device is selected by the user. When the user presses a "Save" button 1503, the server 202 stores the displayed client information and service and the selected network devices in association with each other in the storage device or the like in the server 202.

FIG. 15B illustrates an example of the management table of association among the clients, the services, and the network devices, set in FIG. 15A. The example indicates that the services having the function ID of E001 and E003 are executed in the client having the client ID of 0001C0001. Further, it can be seen from the table that four network devices which are the targets of the service having the function ID of E001, and five network devices which are the targets of the service having the function ID of E003 are set respectively.

Creation of a client, creation of a client installer, and installation and validation processing of the client are similar to those in the first exemplary embodiment.

Figure 16:
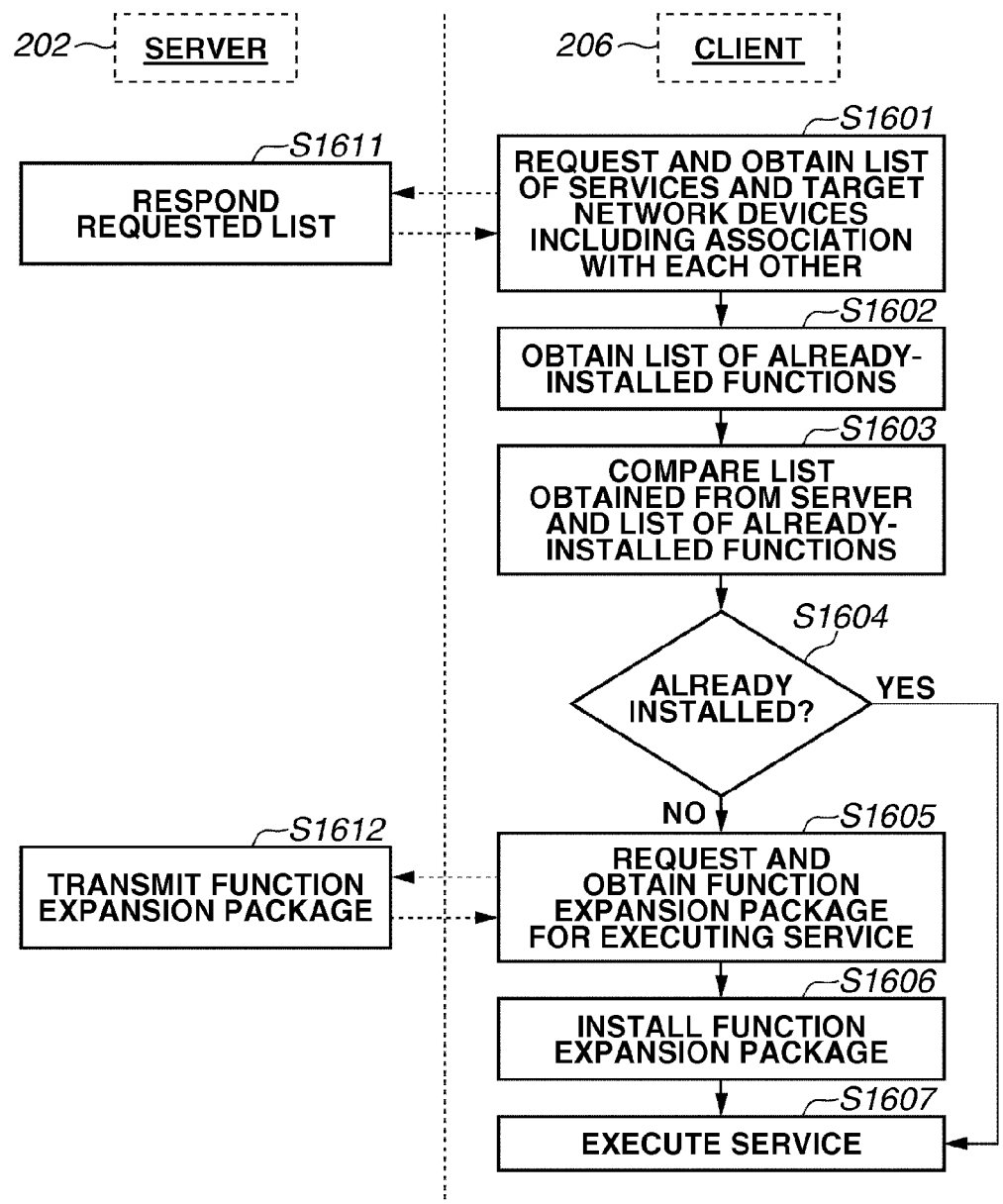
FIG. 16 is a flow chart illustrating processing performed by a client according to the second exemplary embodiment.

FIG. 16 is a flow chart illustrating the processing of the client 206 from obtaining information indicating a provided service and a network device to be a target of the service to starting the service. The processing in FIG. 16 is an application of that in steps S306 and S313 in FIG. 3 described above. The left side in FIG. 16 indicates the processing of the server 202, and the right side indicates the processing of the client 206.

In step S1601, the client 206 requests a list including correspondence between the service associated with the client 206 and the target network device to the server 202. In step S1611, the server 202 which has received the request from the client 206, obtains information corresponding to the client 206 from the management table including the association indicated in FIG. 15B, and returns the obtained information to the client 206.

In step S1602, the client 206 obtains a list of functions which have been already installed in itself. The functions included in the list obtained in step S1602 are functions for realizing the services provided by the network device management system. The functions include, for example, a function of collecting log information from the network devices, and a function of transmitting the collected log information to the server 202. Next, in step S1603, the client 206 compares the service included in the list obtained from the server 202 in step S1601 and the list of already installed functions obtained in step S1602. In step S1604, as a result of the comparison, if it is determined that all functions necessary for the services included in the list obtained from the server 202 in step S1601 have been already installed (YES in step S1604), the processing proceeds to step S1607. On the other hand, in step S1604, as a result of the comparison, if it is determined that the functions necessary for the services included in the list obtained from the server 202 in step S1601 have not been installed yet (NO in step S1604), the processing proceeds to step S1605.

In step S1605, the client 206 designates function ID as information indicating a function to be expanded, and requests a package for installing the corresponding function from the server 202. In step S1612, the server 202 which has received the request transmits a function expansion package corresponding to the designated function ID to the client 206. The client 206 receives the package. In step S1606, the client 206 performs function expansion by installation using the received package.

More specifically, if it is designated by the function ID to add the above-described failure prediction service, the client 206 needs to have a function of collecting information to be used in analysis such as various types of counter information or trouble information from the network devices. Further, the client 206 needs to have a function of once transmitting these pieces of collected information to the other system 1401. In a case where security is taken into account at the time of the transmission, initialization processing such as obtaining information such as a signature key necessary for communication with the server 202 from the other system 1401 needs to be performed. In other words, the installation processing in step S1606 includes the initialization processing for network communication as needed in addition to the function expansion.

In step S1607, the client 206 appropriately executes the service on the target devices using the list obtained from the server 202 in step S1601.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-173962 filed Aug. 6, 2012, which is hereby incorporated by reference herein in its entirety.

What is claimed is:

1. A management system including a management server for managing one or more target devices located in a customer environment, and a client device located in the customer environment, the management server comprising:
one or more memories storing instructions; and
one or more processors,
wherein the instructions, when executed by the one or more processors, cause the management server to perform operations comprising:
associating client information identifying the client device located in the customer environment with one or more target device identifiers identifying the one or more target devices, the client device being separate from the one or more target devices and responsible for collecting data from the one or more target devices;
generating a client installer to install client software on the client device, wherein the client information is included in the generated client installer;
transmitting the generated client installer to the client device;
validating the client device on which the client software has been installed in response to a validation request received from the client device on which the client software has been installed, the validation request including the client information;
receiving from the validated client device a request for the one or more target device identifiers;
after determining that the client device has been validated, sending, to the validated client device, the one or more target device identifiers; and
obtaining data regarding the one or more target devices from the installed client software on the client device, wherein the client device comprises one or more memories storing second instructions related to the client software that has been installed on the client device according to an execution of the client installer generated by the management server, and one or more processors capable of executing the second instructions causing the client device to:
transmit the validation request to the management server after the client installer has installed the client software on the client device according to the execution of the client installer, wherein the validation request includes the client information included in the client installer;
transmit the request for the one or more target device identifiers to the management server;
obtain the data regarding the one or more target devices from the one or more target devices, via a local network in the customer environment, based on the one or more target device identifiers sent by the management server, wherein the data regarding the one or more target devices comprises at least one of log information, counter information, status information, and a setting value; and
transmit, to the management server, the obtained data.

2. The management system according to claim 1, wherein the client device is further configured to obtain, from the management server, a package for expanding a function of transmitting counter information of the one or more target devices, and install the package.

3. A management system for managing one or more target devices located in a customer environment, the management system comprising:
one or more memories storing instructions; and
one or more processors,
wherein the instructions, when executed by the one or more processors, cause the management system to perform operations comprising:
associating client information identifying a client device located in the customer environment with one or more target device identifiers identifying the one or more target devices, the client device being separate from the one or more target devices and responsible for collecting data from the one or more target devices;
generating a client installer to install client software on the generated client device, wherein the client information is included in the generated client installer;
transmitting the generated client installer to the client device;
receiving a validation request including the client information from the installed client software on the client device after the client software has been installed on the client device according to an execution of the client installer;
validating the client device on which the client software has been installed in response to the validation request received from the client device on which the client software has been installed, the validation request including the client information;
receiving from the validated client device a request for the one or more target device identifiers;

after determining that the client device has been validated, sending, to the validated client device, the one or more target device identifiers, wherein the client software on the client device obtains data comprising at least one of log information, counter information, status information, and a setting value, from the one or more target devices, via a local network in the customer environment, based on the one or more target device identifiers sent by the management system; and receiving the obtained data from the client software installed on the client device.

4. The management system according to claim 3, wherein the instructions, when executed, further cause the management system to store validated date and time information and key information together with the client information at a time when validation processing of the client device on which the client software has been installed is being performed.

5. The management system according to claim 3, wherein, in response to the request from the validated client device for the one or more target device identifiers, information indicating a service to be provided by the client device is sent in addition to sending the one or more target device identifiers, and wherein the instructions, when executed, further cause the management system to transmit a package to expand a function necessary for executing the service in response to a request for the package from the client device.

6. The management system according to claim 3, wherein the instructions, when executed, further cause the management system to send key information created for the client device as a response to the validation request received from the client device, and wherein a signature using the sent key information is used in communications from the client device to the management system after the client device is validated.

7. A method performed in a management system for managing one or more target devices located in a customer environment, the method comprising:

associating client information identifying a client device located in the customer environment with one or more target device identifiers identifying the one or more target devices, the client device being separate from the one or more target devices and responsible for collecting data from the one or more target devices;

generating a client installer to install client software on the client device, wherein the client information is included in the generated client installer;

transmitting the generated client installer to the client device;

receiving a validation request including the client information from the installed client software on the client device after the client software has been installed on the client device according to an execution of the client installer;

validating the client device on which the client software has been installed in response to the validation request received from the client device on which the client software has been installed, the validation request including the client information;

receiving from the validated client device a request for the one or more target device identifiers;

after determining that the client device has been validated, sending, to the validated client device, the one or more target device identifiers, wherein the client software on the client device obtains data comprising at least one of log information, counter information, status information, and a setting value, from the one or more target devices, via a local network in the customer environment, based on the one or more target device identifiers sent by the management system; and receiving the obtained data from the client software installed on the client device.

8. A non-transitory computer-readable storage medium storing instructions which, when executed, cause a management system to perform a process for managing one or more target devices located in a customer environment, the process comprising:

associating client information identifying a client device located in the customer environment with one or more target device identifiers identifying the one or more target devices, the client device being separate from the one or more target devices and to be responsible for collecting data from the one or more target devices;

generating a client installer to install client software on the client device, wherein the client information is included in the generated client installer;

transmitting the generated client installer to the client device;

receiving a validation request including the client information from the installed client software on the client device after the client software has been installed on the client device according to an execution of the client installer;

validating the client device on which the client software has been installed in response to the validation request received from the client device on which the client software has been installed, the validation request including the client information;

receiving from the validated client device a request for the one or more target device identifiers;

after determining that the client device has been validated, sending, to the validated client device, the one or more target device identifiers, wherein the client software on the client device obtains data comprising at least one of log information, counter information, status information, and a setting value, from the one or more target devices, via a local network in the customer environment, based on the one or more target device identifiers sent by the management system; and receiving the obtained data from the client software installed on the client device.

* * * * *